US010870370B2

(12) United States Patent
Haller

(10) Patent No.: US 10,870,370 B2
(45) Date of Patent: Dec. 22, 2020

(54) VEHICLE SEAT

(71) Applicant: GRAMMER AG, Amberg (DE)

(72) Inventor: Thomas Haller, Ursensollen (DE)

(73) Assignee: GRAMMER AG, Amberg (DE)

( * ) Notice: Subject to any disclaimer, the term of this patent is extended or adjusted under 35 U.S.C. 154(b) by 98 days.

(21) Appl. No.: 16/172,445

(22) Filed: Oct. 26, 2018

(65) Prior Publication Data
US 2019/0126788 A1 May 2, 2019

(30) Foreign Application Priority Data

Oct. 27, 2017 (DE) .................. 10 2017 125 338

(51) Int. Cl.
B60N 2/22 (2006.01)
B60N 2/14 (2006.01)
B60N 2/02 (2006.01)
B60N 2/868 (2018.01)
B60N 2/28 (2006.01)
B60N 2/38 (2006.01)
(Continued)

(52) U.S. Cl.
CPC ......... B60N 2/2222 (2013.01); B60N 2/0252 (2013.01); B60N 2/146 (2013.01); B60N 2/2851 (2013.01); B60N 2/38 (2013.01); B60N 2/64 (2013.01); B60N 2/868 (2018.02); B60N 2002/022 (2013.01); B60N 2002/0272 (2013.01); B60N 2002/948 (2018.02); B60N 2205/35 (2013.01)

(58) Field of Classification Search
None
See application file for complete search history.

(56) References Cited

U.S. PATENT DOCUMENTS 4,802,706 A * 2/1989 Onimaru ............... B60N 2/0224
296/68
5,909,926 A * 6/1999 Gonzalez ............... B60N 2/143
297/301.4
(Continued)

FOREIGN PATENT DOCUMENTS

DE 102011055895 6/2013
DE 102014117101 5/2016
DE 102015212459 1/2017

OTHER PUBLICATIONS

Extended Search Report for European Patent Application No. 18201422.5, dated Apr. 5, 2019, 3 pages.
(Continued)

Primary Examiner — David R Dunn
Assistant Examiner — Christopher E Veraa
(74) Attorney, Agent, or Firm — Sheridan Ross P.C.

(57) ABSTRACT

Vehicle seat having a backrest consisting of a backrest lower part and a backrest upper part, which is displaceable with respect to the backrest lower part, wherein the vehicle seat is connected to a rotary adjustment device for rotating the vehicle seat, and wherein the rotary adjustment device comprises a locking device for locking the rotary adjustment device, the backrest upper part and the locking device being connected to each other, such that upon a displacement of the backrest upper part relative to the backrest lower part from a non-displaced position into a displaced position, the locking of the rotary adjusting device may be released.

8 Claims, 11 Drawing Sheets

(51) Int. Cl.
*B60N 2/64* (2006.01)
*B60N 2/90* (2018.01)

(56) References Cited

U.S. PATENT DOCUMENTS

| | | | |
|---|---|---|---|
| 2013/0175837 A1* | 7/2013 | Buehlmeyer | B60N 2/753 297/284.1 |
| 2015/0015045 A1* | 1/2015 | Uebelacker | B60N 2/2222 297/383 |
| 2015/0015046 A1* | 1/2015 | Uebelacker | B60N 2/2222 297/383 |
| 2015/0015047 A1* | 1/2015 | Uebelacker | B60N 2/2209 297/383 |
| 2016/0039315 A1* | 2/2016 | Haller | B60N 2/08 297/270.1 |
| 2017/0297721 A1* | 10/2017 | Davis | B60N 2/06 |

OTHER PUBLICATIONS

Official Action for German Patent Application No. 102017125338.6, dated Jun. 15, 2018, 3 pages.

* cited by examiner

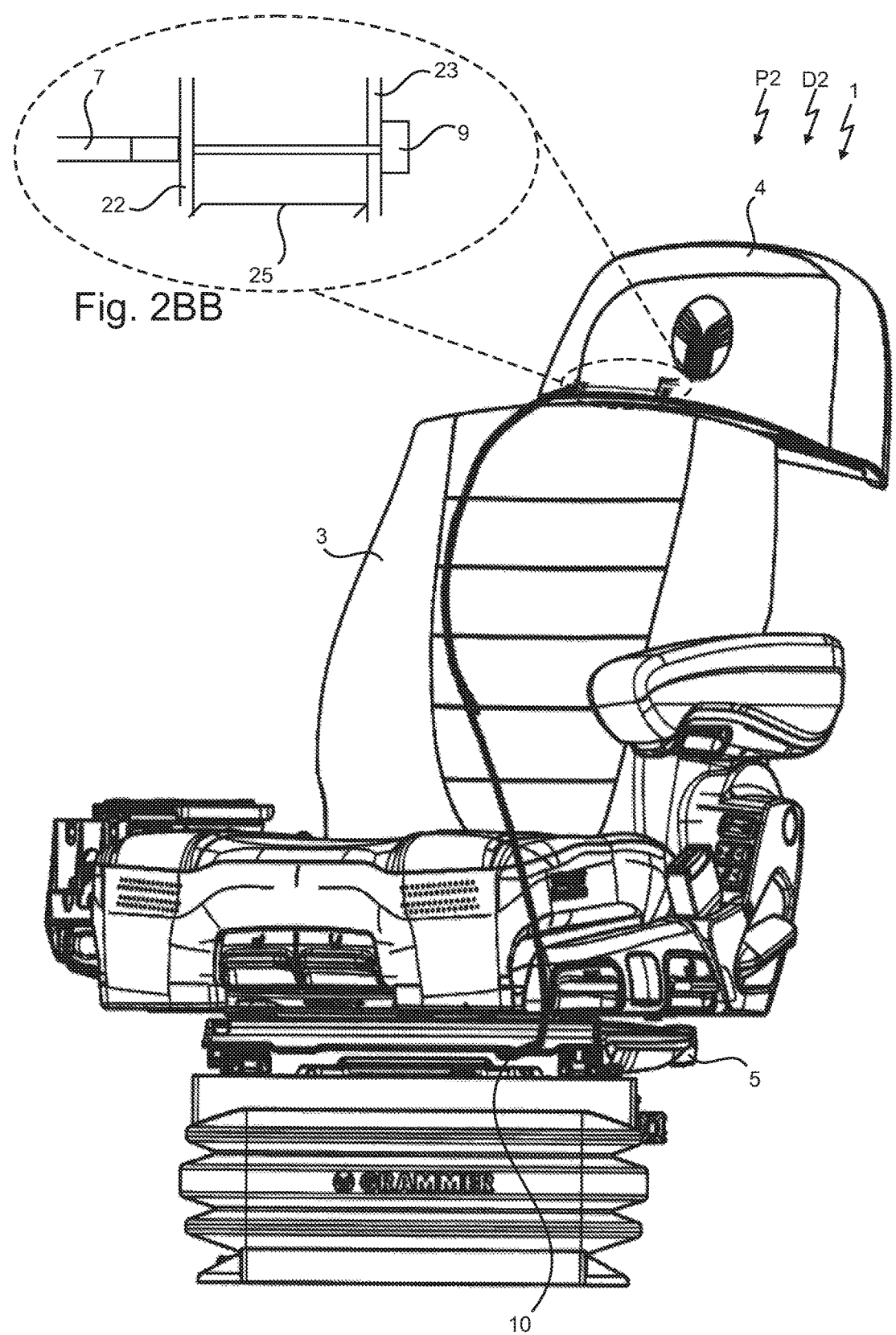

VEHICLE SEAT

CROSS-REFERENCE TO RELATED APPLICATIONS

This Application claims the benefit of German Patent Application No. DE 10 2017 125 338.6 filed Oct. 27, 2017, the entire contents of which are incorporated herein by reference.

FIELD

The invention relates to a vehicle seat having a backrest consisting of a backrest lower part and a backrest upper part which is displaceable relative to the backrest lower part.

BACKGROUND

Such vehicle seats are known for example from DE 10 2011 055 895, wherein the backrest upper part is displaceable in a variety of ways relative to the backrest lower part.

However, these vehicle seats have the disadvantage that when turning a person's upper body backwards on the vehicle seat, the backrest upper part is displaced in such a way that the chest area or the shoulder area is supported even when the upper body is rotated, whereas the lumbar region or the area below the chest area presses against the backrest lower part and is perceived as unpleasant, since not the entire movement of the rotation of the upper body can be followed by the vehicle seat.

SUMMARY

It is therefore an object of the present invention to provide a vehicle seat which overcomes the above disadvantages and provides a vehicle seat which can precisely follow the movement of the body of a person.

The core idea of the invention is to provide a vehicle seat with a backrest consisting of a backrest lower part and a backrest upper part, which is displaceable relative to the backrest lower part, the vehicle seat being connected to a rotary adjustment device for rotating the vehicle seat, and wherein the rotary adjustment device comprises a locking device for locking the rotary adjustment device wherein the backrest upper part and the locking device are connected to one another in such a way that when the backrest upper part is displaced relative to the backrest lower part from a non-displaced position to a displaced position, the locking of the rotary adjusting device may be released.

This means that upon rotation of the upper body of a person sitting on the vehicle seat, the vehicle seat can simulate the rotation of the upper body. A rotation of the chest or shoulder region results on the seat in a rotational movement of the lumbar region, which can be tracked by the vehicle seat by means of a rotary adjusting device.

However, it is foreseen, that if no displacement of the backrest upper part is provided with respect to the backrest lower part, the rotary adjusting device is locked, that is, no rotation of the vehicle seat is possible.

Preferably, the vehicle seat further comprises a seat part, wherein the backrest lower part is rigidly connected to the seat part. As a result, the movement of the seat part and the backrest lower part are the same, if provided.

More preferably, the locking means is provided with a locking element which may be contacted with the rotary adjustment device in order to lock or latch the rotary adjustment device, or may be released from the rotary adjustment device to unlock the rotary adjustment device.

According to a first preferred embodiment, a first Bowden cable is provided, wherein a first end of the Bowden cable is connected to the backrest upper part and a second end of the Bowden cable is connected with the locking device such that in case of a displacement of the backrest portion from the non-displaced position into the displaced position, the first end of the Bowden cable may be displaced, whereby a pulling force or tension may be transmitted to the locking device and the locking of the rotary adjusting device may be released.

In particular, the first end of the Bowden cable is connected to the backrest upper part in such a way that the first end of the Bowden cable is displaced with the displacement of the backrest upper part from the non-displaced position to the displaced position, whereby a pulling force or tension is transmitted to the Bowden cable via the first end.

Preferably, it is conceivable that a holding device is provided, which is connected to both the Bowden cable, in particular in the region of the first end of the Bowden cable, and the backrest lower part. This means that the holding device is not displaced in case of a displacement of the backrest upper part relative to the backrest lower part.

According to a further preferred embodiment, the first Bowden cable is a push-pull Bowden cable. This means that both tensile forces and compressive forces can be transmitted by means of the first Bowden cable. In particular, this means that when the backrest upper part is in the displaced position, the locking of the rotary adjusting device can be produced by displacing the backrest part from the displaced position into the non-displaced position.

According to an alternative embodiment, a second Bowden cable is provided, which is connected to the rotary adjusting device and to the backrest upper part and is provided and arranged in order to transfer the backrest upper part from the displaced position into the non-displaced position by rotation of the vehicle seat by the rotary adjusting device from a rotated position to a normal position of the vehicle seat.

By means of the second Bowden cable, it is thus possible to return the displaced backrest upper part only by rotating the vehicle seat from the rotated position to a normal position or unrotated position to the non-displaced position.

In summary, therefore, the backrest upper part can be brought from the non-displaced position to the displaced position by means of the first Bowden cable, wherein the locking of the rotary adjusting device is released, and by means of the second Bowden cable, the backrest upper part from the displaced position to the non-displaced position when the vehicle seat is transferred from the rotated into the unrotated position.

If, however, the first Bowden cable is a Bowden cable which can transmit only tensile forces, it is advantageous according to a further embodiment that a return spring is connected to the second end of the Bowden cable, wherein by means of the return spring, the lock can be produced upon displacement of the backrest upper part from the displaced position into the non-displaced position.

Since a tensile force is transmitted by means of the first Bowden cable, the return spring is preferably a compression spring or a torsion spring. In such springs, the spring is deformed when transmitting a pulling force or tension and it builds up a restoring force, which is directed against the pulling force or tension of the Bowden cable.

According to a preferred alternative embodiment, a first sensor is provided, which is designed and provided to detect a displacement of the backrest upper part relative to the backrest lower part from a non-displaced position to a displaced position, wherein after detection of this displacement of the backrest upper part, the locking of the rotary adjusting device is releasable, and is designed and provided also to detect a displacement of the backrest upper part from the displaced position into the non-displaced position, wherein after this displacement, the locking of the rotary adjusting device can be obtained.

By means of the first sensor, it is therefore possible to detect the displacement of the backrest upper part, in each direction of displacement, that is, from the non-displaced position to the displaced position, and vice versa.

Further, after completion of the displacement either the locking of the rotary adjusting device is released or generated, depending on the type or direction of the displacement.

For this purpose, it is advantageous, according to a preferred embodiment, that an electronic control unit is provided, which is designed and provided to receive and process first signals of the first sensor, wherein starting and depending on the first signals of the first sensor, the electronic control unit may transmit a locking device control signal to an actuator unit, said actuator unit being provided and configured to actuate the locking device.

This means in particular the following: due to the detection of the displacement of the backrest upper part, the first sensor sends first signals, in particular to the electronic control unit, wherein the first signals contain information that a displacement of the backrest upper part has been detected. The electronic control unit processes these signals in a corresponding manner, in particular the control unit recognizes which type of displacement is involved, that is to say either a movement from the non-displaced position into the displaced position or from the displaced position into the non-displaced position. Depending on this decision, the locking device is actuated by the control unit, namely the lock of the rotary adjusting device is either released or generated.

Further advantageous embodiments will be apparent from the dependent claims.

BRIEF DESCRIPTION OF THE DRAWINGS

Other objects, advantages and expediencies of the present invention may be obtained from the description in conjunction with the drawings. In particular:

FIG. 2AA is a detail from FIG. 2A and illustrates a connecting element in accordance with embodiments of the present disclosure;

FIG. 2B is another view in accordance with embodiments of the present disclosure;

FIG. 2BB is a detail from FIG. 2B and illustrates a connecting element in accordance with embodiments of the present disclosure;

DETAILED DESCRIPTION

Figure 1A:
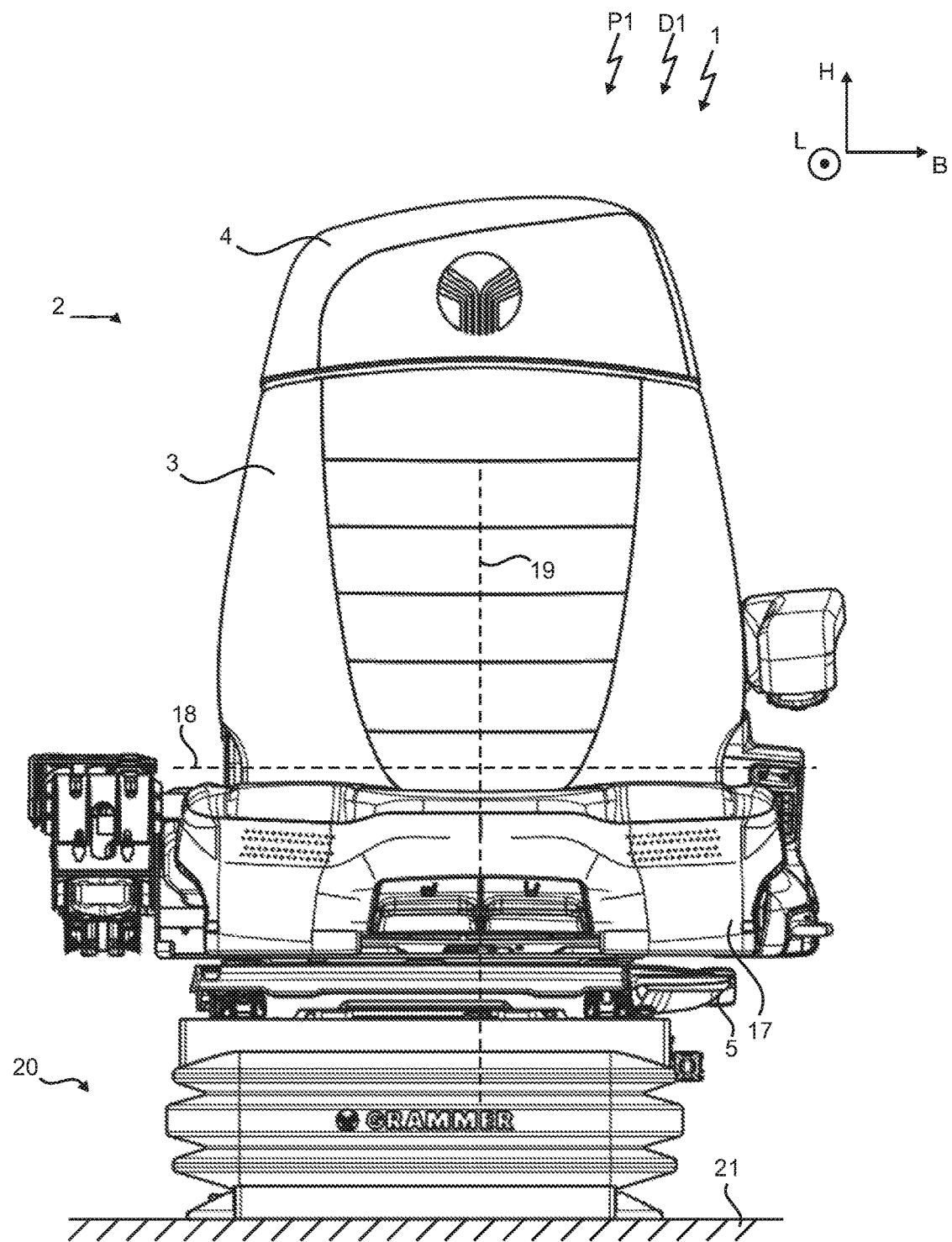
FIG. 1A is a view of a vehicle seat in accordance with embodiments of the present disclosure.

FIG. 1A shows a vehicle seat 1 which has a backrest 2, wherein the backrest 2 has a backrest lower part 3 and a backrest upper part 4. In this case, the backrest upper part is arranged to be displaceable relative to the backrest lower part 3, in particular by means of a displacement device (not shown here). Also, the backrest upper part 4 is arranged in a height direction H above the backrest lower part 3. In addition, the vehicle seat 1 preferably has a seat part 17, the seat part 17 being particularly preferably rigidly connected to one another. Rigid means here, however, that a rotation of the backrest 3 about a first pivot axis 18 is possible, whereby the inclination of the backrest 3 relative to the seat part 17 is adjustable.

Further, the vehicle seat 1 is connected to a rotary adjusting device 5, by means of which the vehicle seat 1 is rotatably mounted about a vertical axis 19.

Further, it is conceivable that a vehicle seat base structure 20 is provided, which may comprise, for example, a suspension and/or an absorber for suspending or cushioning the vehicle seat 1.

The vehicle seat 1 may be disposed and connected by means of the vehicle seat base structure 20 or, if no such vehicle seat base structure 20 is provided, by means of the rotary adjusting device 5 to a body 21 or a vehicle floor 21.

Further in FIG. 1A, both a non-displaced position P1 of the backrest upper part 4 and a normal position D1 or unrotated position D1 of the rotary adjusting device 5 are shown. This means that the vehicle seat 1 as a whole is not rotated either.

As long as the backrest upper part 4 is not displaced, that is, is positioned in the non-displaced position P1, the rotary adjusting device 5 is locked, in such a way that no rotation of the vehicle seat 1 is possible.

Figure 1B:
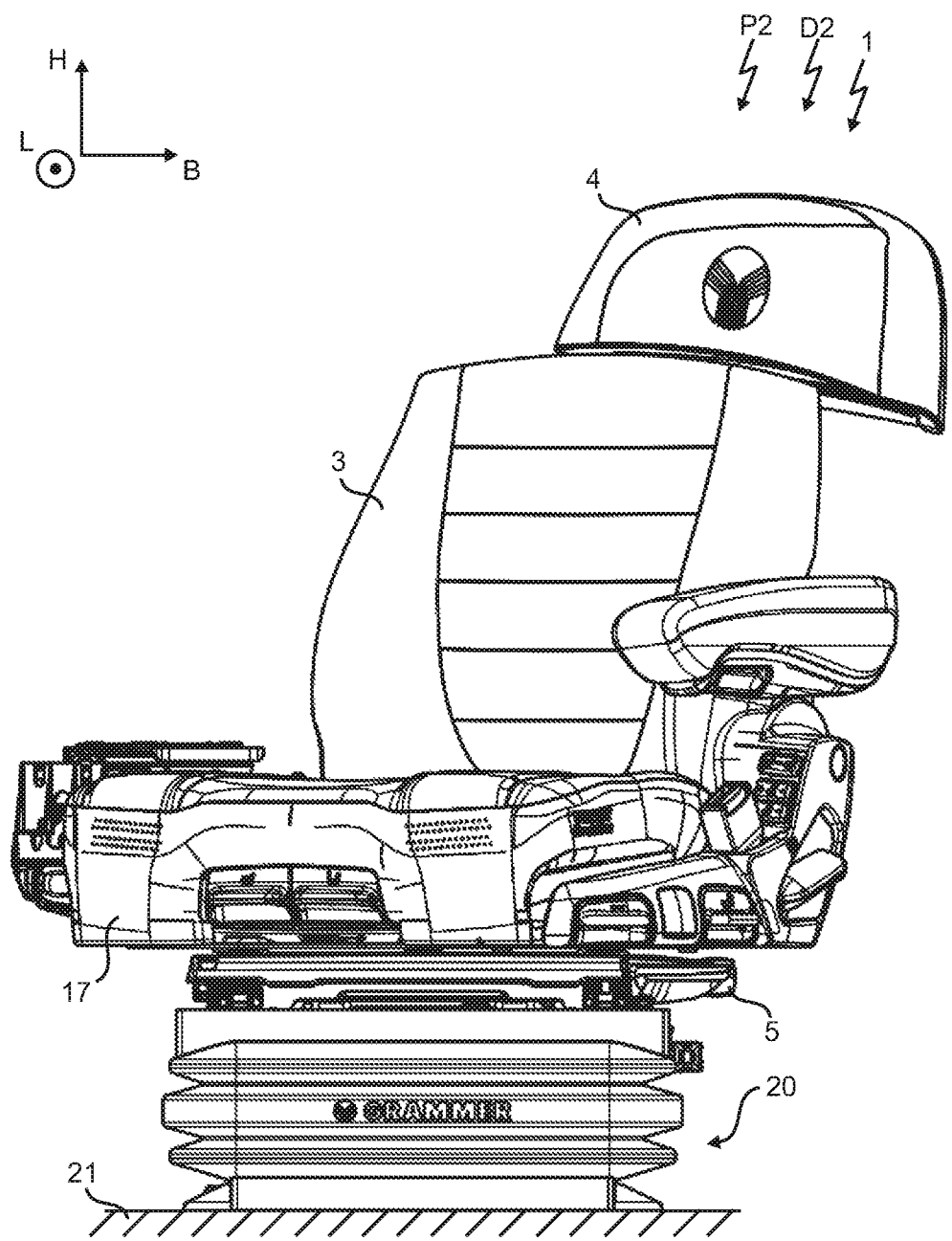
FIG. 1B is another view of a vehicle seat in accordance with embodiments of the present disclosure.

FIG. 1B shows a displaced position P2 of the backrest upper part 4 and a rotated position D2 of the rotary adjusting device 5. That is, the vehicle seat 1 is rotated about the vertical axis 19.

Due to the displacement of the backrest upper part 4, the locking of the rotary adjusting device 5 is released, that is, a rotation of the vehicle seat 1 is possible.

By the movement of a person who has taken his/her place on the vehicle seat 1, in particular due to a backwards rotation of the chest region or the shoulder region, the vehicle seat 1 can follow the movement of the body of said person by means of the rotary adjusting device 5.

In the following figures, the connection of the backrest upper part 4 and the locking device 6 and the locking device 6 are shown in various embodiments in more detail.

Figure 2A:
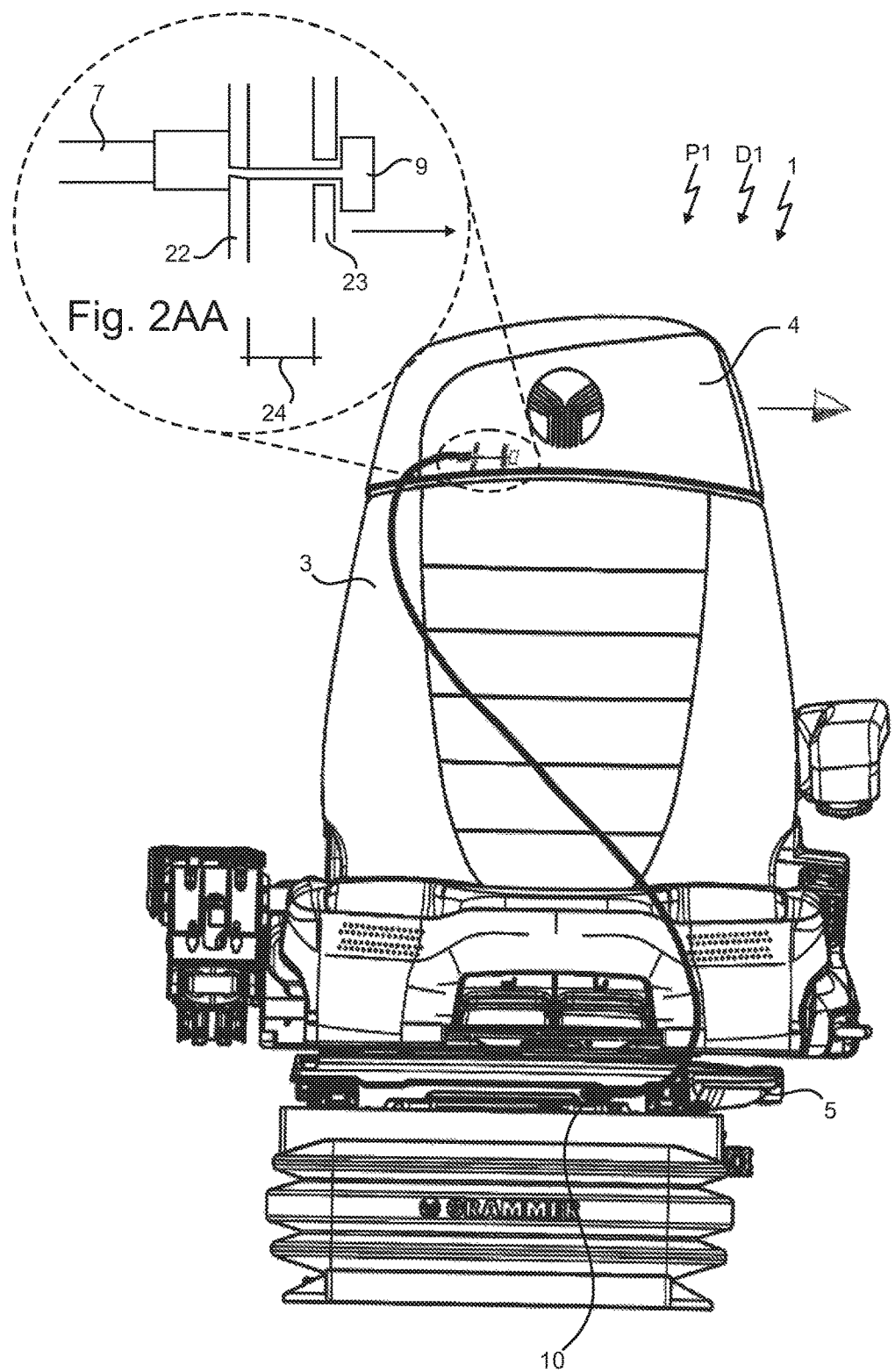
FIG. 2A is yet another view of a vehicle seat in accordance with embodiments of the present disclosure.

FIG. 2A shows the vehicle seat 1 of FIG. 1A and FIG. 2B shows the vehicle seat 1 of FIG. 1B. In addition to this, a first Bowden cable 7 can be seen, with a first end 9 and a second end 10.

Both in FIGS. 2A and 2B, the first Bowden cable 7, in particular the first end 9, is connected to the upper backrest part 4, in such a way that when the backrest upper part 4 is displaced, represented by the arrow, a pulling force or tension is exerted on the first Bowden cable 7.

The second end 10 of the first Bowden cable 7 is connected to the locking device 6 of the rotary adjusting device 5, wherein in the non-displaced position P1, the rotary adjusting device 5 is locked by means of locking device 6, that is, no rotation of the vehicle seat 1 is possible.

FIG. 2AA shows a detail of FIG. 2A in an enlargement. As can be seen, the first Bowden cable 7 is connected on the one hand by means of a first connecting element 22 with the backrest lower part 3, whereas the first end 9 of the first Bowden cable 7 is connected by means of a second connecting element 23 with the backrest upper part 4. The first connection element 22 is arranged at a first distance 24 from the second connection element 23.

FIG. 2B shows the vehicle seat in the displaced position P2 and in the rotated position D2. By displacing the backrest upper part 4 relative to the backrest lower part 3, a pulling force or tension was exerted on the first Bowden cable 7, thereby releasing the locking of the rotary adjusting device 5 by the locking device 6, in such a way that the vehicle seat 1 is rotatable.

Because the first connecting element 22 is connected to the backrest lower part 3 and the second connecting element 23 to the backrest upper part 4, the second connecting element 23 is also displaced in accordance with the displacement of the backrest upper part 4. This means, in particular, that the first distance 24 changes toward a second distance 25, which is greater than the first distance 24 in case of a displacement from the non-displaced position P1 to the displaced position P2.

This means, in particular, that the first end 9 is pulled out of a shell of the first Bowden cable 7 and therefore a pulling force or tension is exerted on the second end 10 of the first Bowden cable 7. By this pulling force or tension, the locking device 6 can be actuated, wherein, in particular, the locking of the rotary adjusting device 5 is released.

Figure 3A:
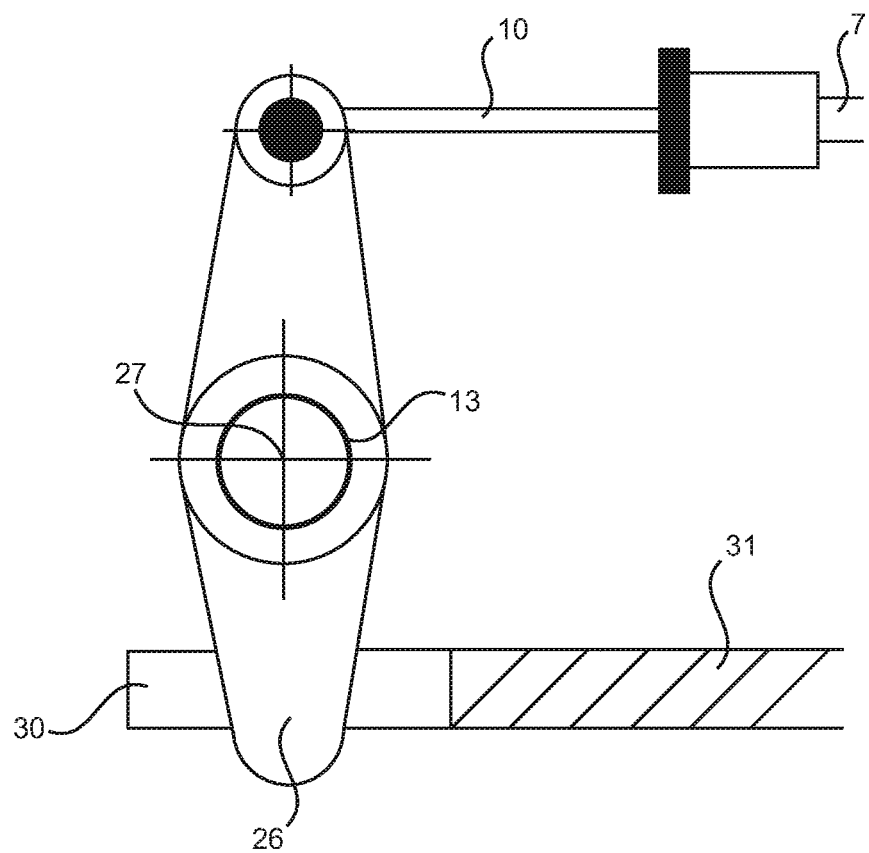
FIG. 3A is view of a locking device for locking a rotary adjusting device in accordance with embodiments of the present disclosure.
Figure 3B:
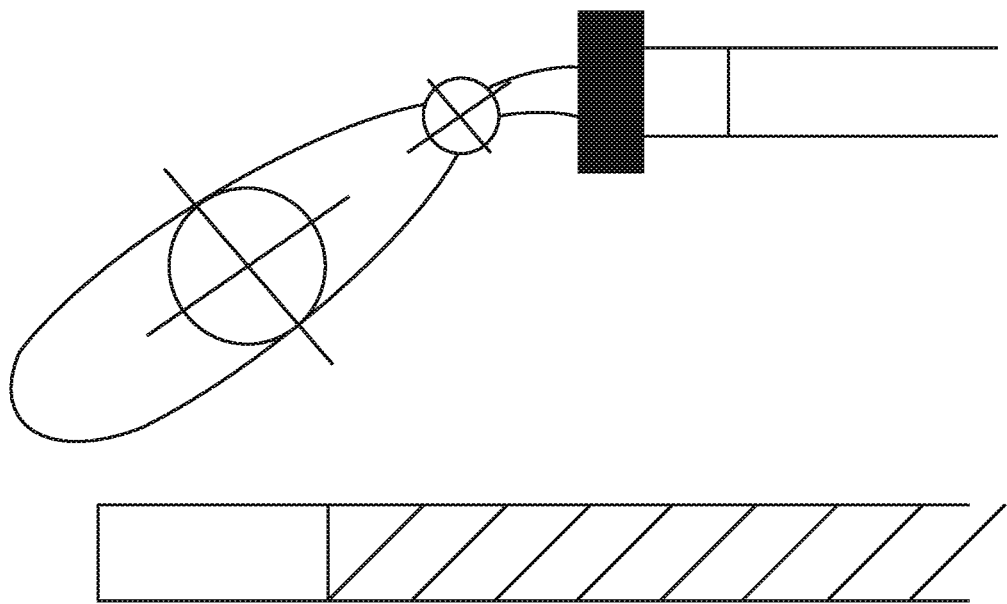
FIG. 3B is another view of a locking device for locking a rotary adjusting device in accordance with embodiments of the present disclosure.

FIGS. 3A and 3B show a first embodiment of a locking device 6 for locking the rotary adjusting device 5.

The locking device 6 in this case comprises a lever element 26, which is pivotable about a second pivot axis 27. The lever element 26 also has a first end 28 and a second end 29, wherein the first end 28 can be brought into contact with an opening 30 of the rotary adjusting device 5, in particular a rotary adapter 31, and the second end 29 is connected with the second end 10 of the first Bowden cable 7. By displacement of the first end 9 of the first Bowden cable 7 also the second end 10 is displaced, whereby the lever element 26 can be pivoted about the second pivot axis 27. This situation is shown in FIG. 3B.

Further, the lever element 26 may be connected to a return spring 32, wherein the return spring 32 may be formed as a torsion spring.

If the first end 28 of the lever element 26 is in contact with the opening, as shown in FIG. 3A, the rotary adjusting device 5 is locked. If the first end 28 is not in contact with the opening 30, as shown in FIG. 3B, the rotary adjusting device 5 is not locked.

Figure 4:
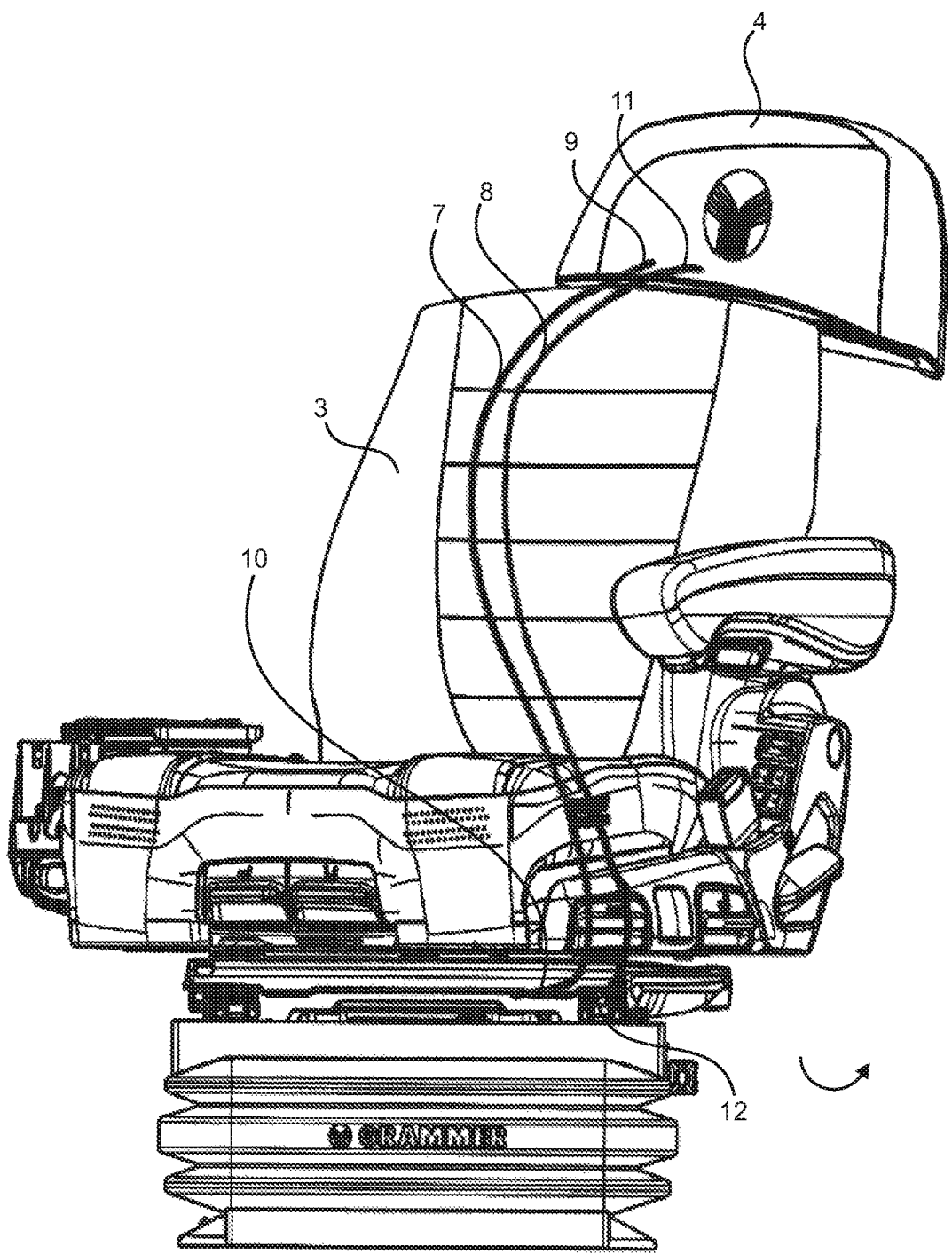
FIG. 4 is a view of a vehicle seat in accordance with another embodiment of the present disclosure.

FIG. 4 shows a further embodiment of the vehicle seat 1, wherein an additional second Bowden cable 8 is provided.

This second Bowden cable 8 is connected on the one hand with the rotary adjusting device 5 and on the other hand with the backrest upper part 4. In this case, the second Bowden cable 8 is suitable for bringing the backrest upper part 4 from the displaced position P2 into the non-displaced position P1 by rotating the vehicle seat 1 from the rotated position D2 to the normal position D1.

For this purpose, the second Bowden cable 8 as well has a first end 11 and a second end 12, wherein the first end 11 is connected to the backrest upper part 4 and the second end 12 is connected with the rotary adjusting device 5. By turning the vehicle seat 1 from the rotated position D2 to the normal position D1, a pulling force or tension is transmitted to the first end 11 via the second end 12 and the backrest upper part 4 is displaced from the displaced position P2 to the non-displaced position P1.

Figure 5A:
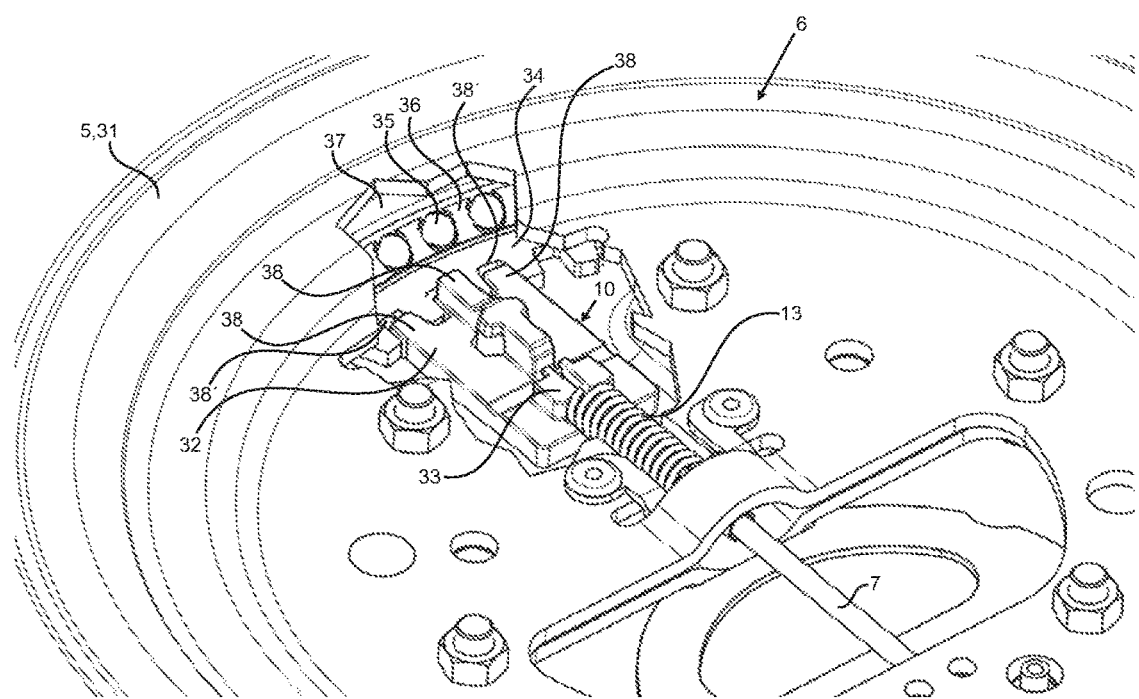
FIG. 5A is a view of the locking device, showing the locking device in a locked state, in accordance with another embodiment of the present disclosure.
Figure 5B:
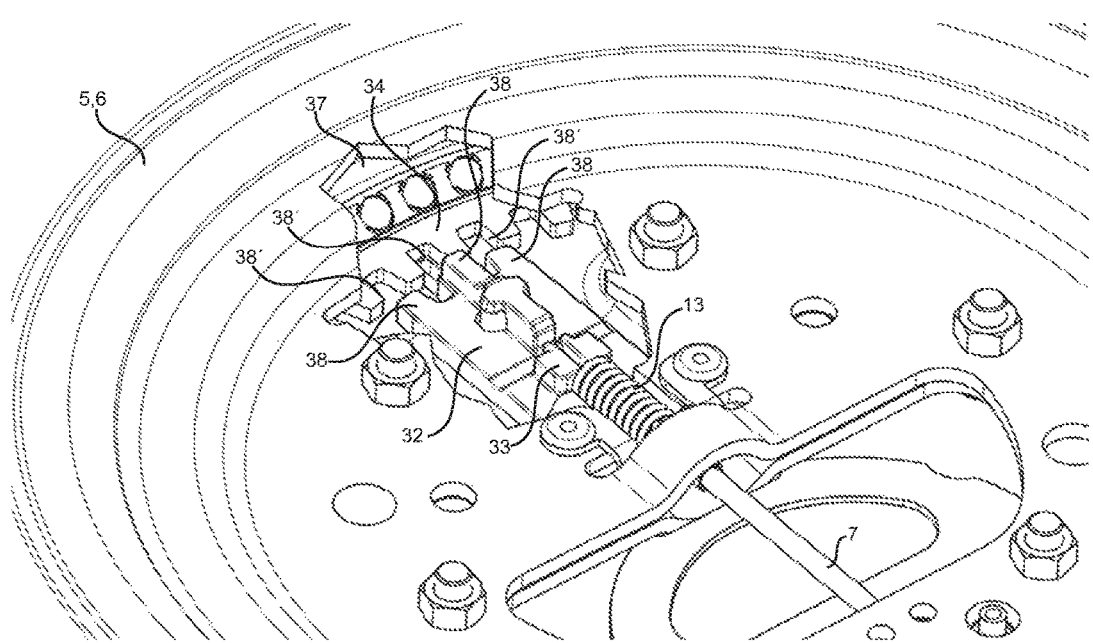
FIG. 5B is a view of the locking device, showing the locking device in an unlocked state, in accordance with another embodiment of the present disclosure.
Figure 5C:
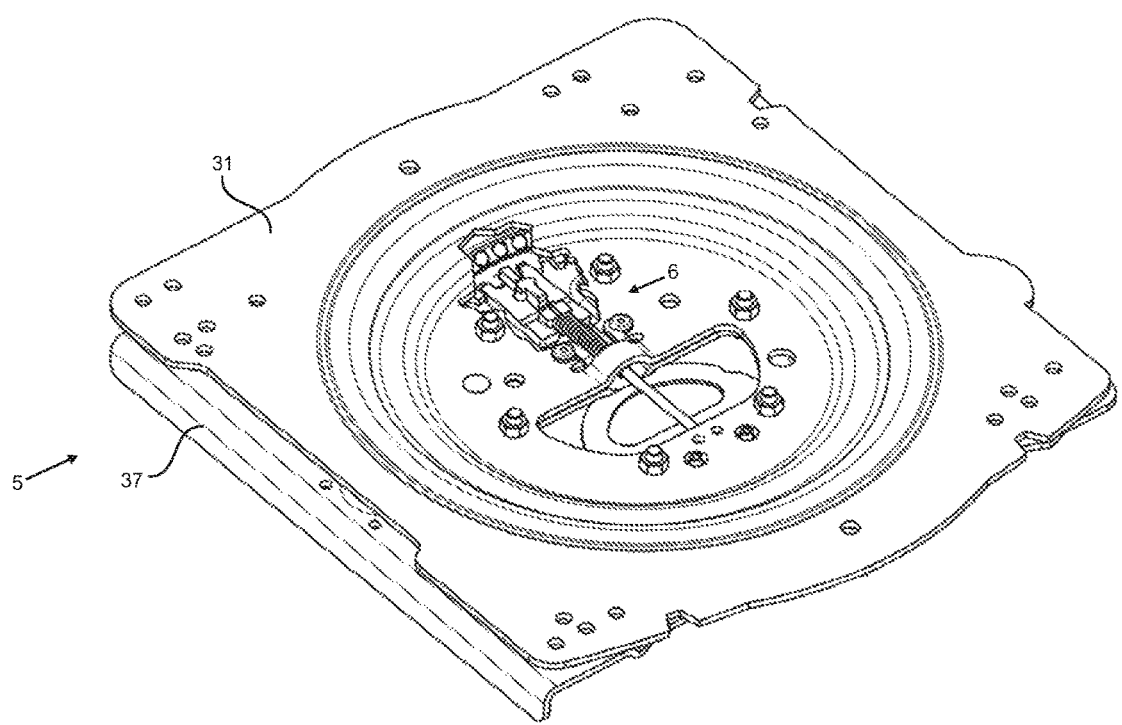
FIG. 5C is a view of the locking device, showing perspective view of the rotary adjusting device, in accordance with another embodiment of the present disclosure.

FIGS. 5A, 5B and 5C show a further embodiment of the locking device 6, wherein the locking device 6 is formed as described in more detail below.

First, the rotary adapter 6 or the rotary adjusting device 5 has a sprocket 34, which is presently designed as an internal sprocket 34. The rotary adapter 6 is rotatably mounted with respect to a rotating adapter base 37 by means of a ball bearing 36 with ball elements 35.

The locking device 6 has in particular a locking element 32, which is designed such that the locking element 32 is formed complementary to the sprocket 34. The locking element 32 preferably has three teeth 38 which can be brought into contact with corresponding tooth gaps 38'.

If the teeth 38 of the locking element 32 engage in the tooth gaps 38' of the sprocket 34, the rotary adjusting device 6 is locked, as shown in FIG. 5A; if the teeth 38 do not engage in the tooth gaps 38', then the rotary adjusting device is unlocked, as shown in FIG. 5B.

Further, the first Bowden cable 7 is connected with its first end 9 by means of a Bowden cable attachment 33 with the locking element 32, and further a return spring 13, in the present case designed as a compression spring, is also provided, which is in operative contact with the locking element 32 and the rotary adapter 5.

By exerting a pulling force or tension by displacement of the backrest upper part 4 from the non-displaced position P1 to the displaced position P2, the second end 10 of the first Bowden cable is displaced accordingly, in such a way that as a consequence the locking element 32 connected thereto is also displaced and the return spring 13 is compressed.

If the backrest upper part 4 is then displaced back from the displaced position P2 to the non-displaced position, then no tension is exerted, as a result of which the return spring 13 automatically brings the locking element 32 into a locked state and locks the rotary adjusting device 5.

FIG. 5A shows the locking device 6 in a locked state, FIG. 5B shows the locking device 6 in an unlocked state, and FIG. 5C shows a perspective view of the entire rotary adjusting device 5 with a locking device 6.

Figure 6A:
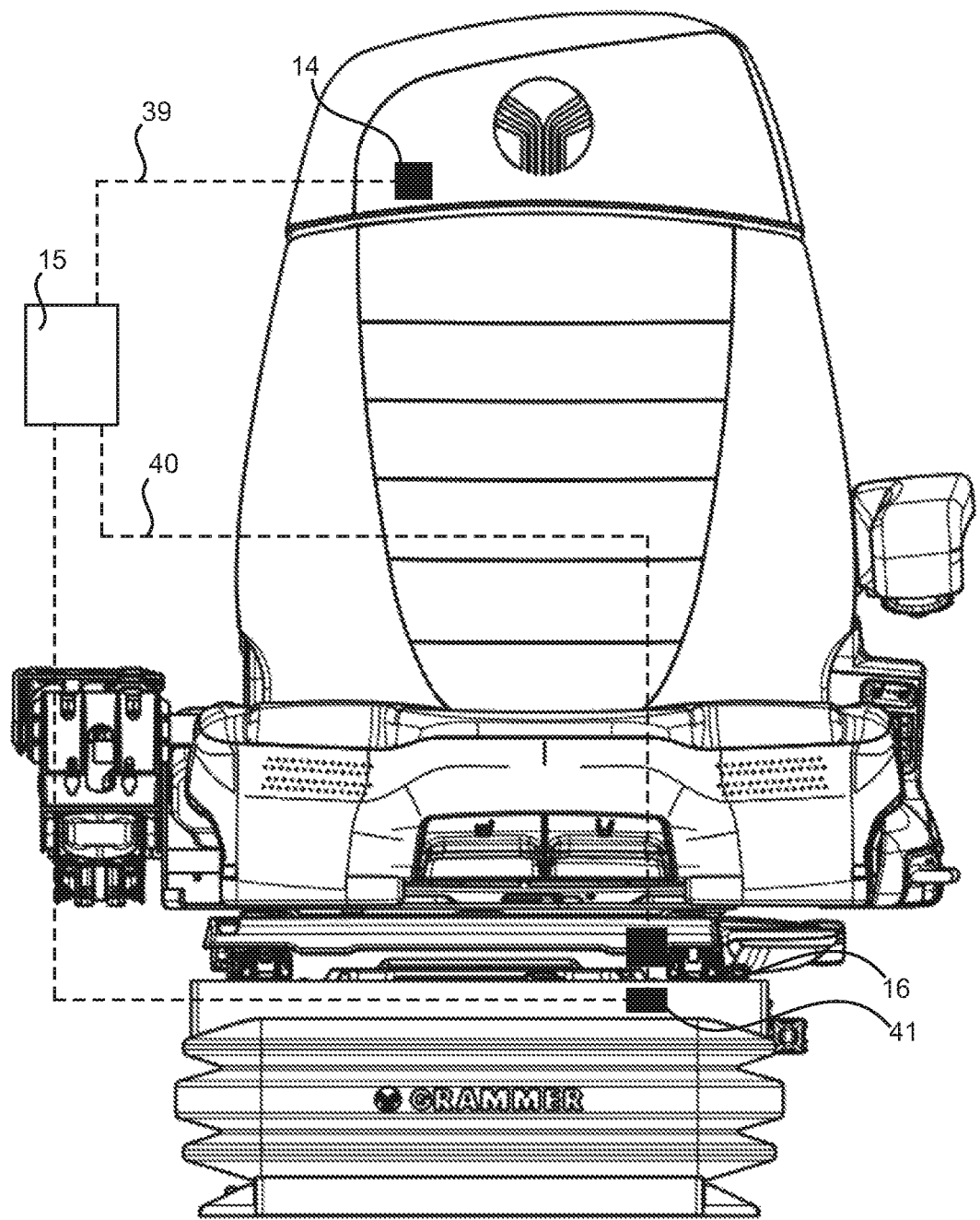
FIG. 6A is a front view of a vehicle seat in accordance with an alternative the present disclosure.
Figure 6B:
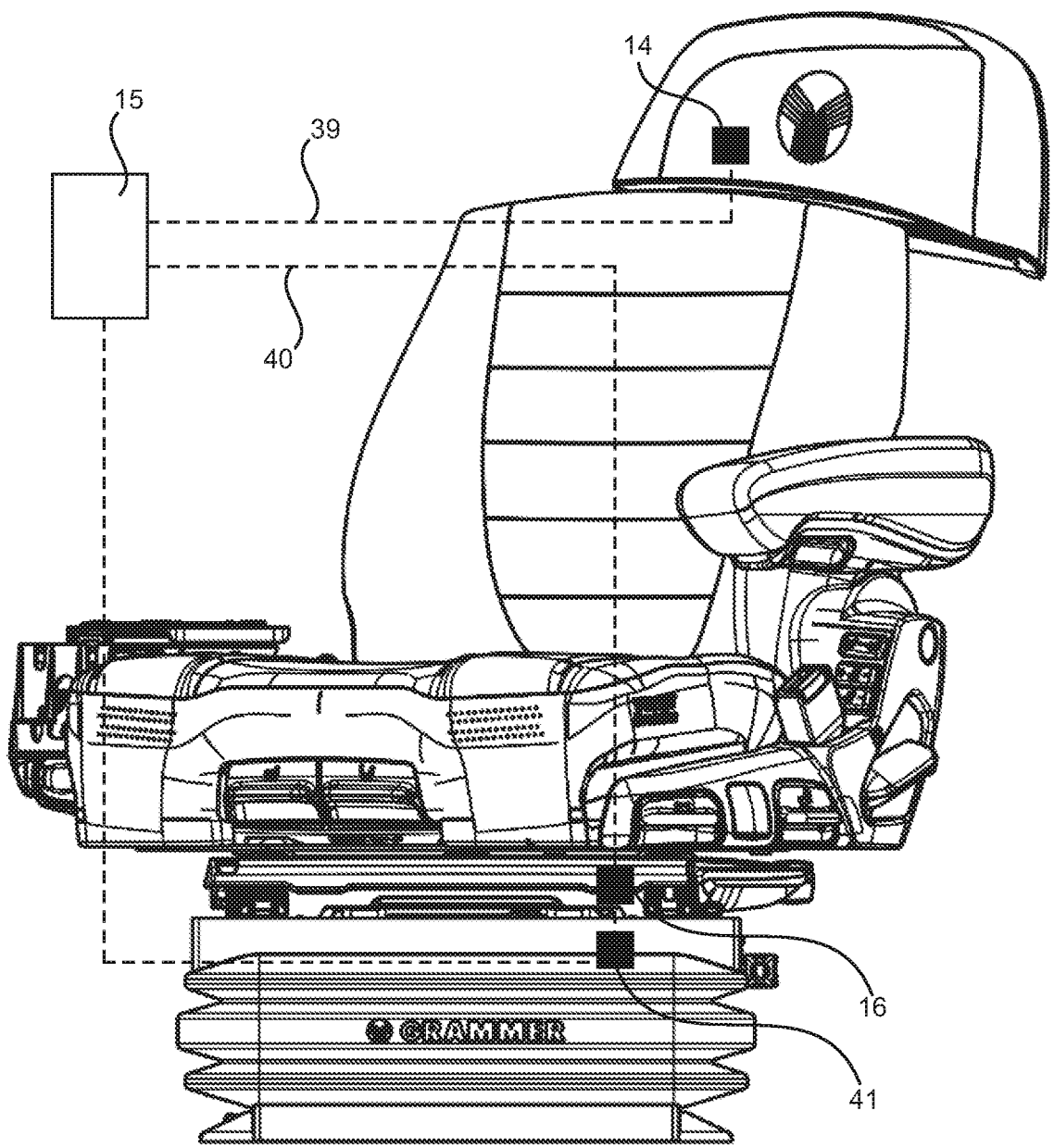
FIG. 6B is another view of a vehicle seat in accordance with the alternative the present disclosure.

In FIGS. 6A and 6B, an alternative embodiment is shown, which does not include Bowden cables, whereas the locking device 6 is controlled electronically.

In particular, a first sensor 14 is provided, which is designed and provided to detect a displacement of the backrest upper part 4 relative to the backrest lower part 3 from an non-displaced position P1 to a displaced position P2, wherein after detection of this displacement of the backrest upper part 4, the locking of the rotary adjusting device 5 is releasable by means of the locking device 6, and to detect a displacement of the backrest upper part 4 from the displaced position P2 into the non-displaced position P1, wherein after this displacement, the locking of the rotary adjusting device is obtained by means of the locking device 6.

Further preferably, an electronic control unit 15 is provided, which is designed and provided to receive and process first signals 39 of the first sensor 14, wherein starting from the signals of the first sensor 14, the electronic control unit 15 may transmit a locking device control signal 40 to an actuator unit 16, wherein the actuator unit 16 is provided and configured to actuate the locking device 6.

The actuation of the locking device 6 by the actuator unit 16 depends on the type of displacement. If the backrest upper part 4 is displaced from the non-displaced position P1 to the displaced position P2, then the locking device control signal 40 is sent with the information that the lock has to be released. If the seat back upper part 4 is displaced from the displaced position P2 to the non-displaced position P1, the locking device control signal 40 is sent with the information that the lock has to be engaged.

Particularly preferred is a locking which is only made when the rotary adjusting device 5 is in the normal position D1. For this purpose, a second sensor 42 may be provided, wherein the second sensor 41 is connected to the control unit 15 by signalling technology.

All features disclosed in the application documents are essential to the invention as claimed, provided that they are novel, individually or in combination, with respect to the prior art.

LIST OF REFERENCE NUMERALS 1 vehicle seat
2 backrest
3 backrest lower part
4 backrest upper part
5 rotary adjustment device
6 locking device
7 first Bowden cable
8 second Bowden cable
9 first end of the first Bowden cable
10 second end of the first Bowden cable
11 first end of the second Bowden cable
12 second end of the second Bowden cable
13 return spring
14 first sensor
15 control unit
16 actuator unit
17 seat part
18 first pivot axis
19 vertical axis
20 vehicle seat base structure
21 body
22 first connecting element
23 second connecting element
24 first distance
25 second distance
26 lever element
27 second pivot axis
28 first end of the lever element
29 second end of the lever element
30 opening
31 rotation adapter
32 locking element
33 Bowden cable attachment
34 sprocket
35 ball element
36 ball bearing
37 rotating adapter base
38 tooth
38' tooth gap
39 first signal
40 locking device control signal
41 second sensor
P1 non-displaced position
P2 displaced position
D1 normal position
D2 rotated position
L longitudinal direction
H height direction
B width direction

What is claimed is:

1. A vehicle seat, comprising:
a backrest comprising a backrest lower part and a backrest upper part that can be displaced relative to the backrest lower part, wherein the vehicle seat is connected to a rotary adjusting device for rotating the vehicle seat, and wherein the rotary adjusting device comprises a locking device for locking the rotary adjusting device, wherein the backrest upper part and the locking device are interconnected such that upon a displacement of the backrest upper part relative to the backrest lower part from a non-displaced position into a displaced position, the locking of the rotary adjusting device is releasable; and
a first Bowden cable, wherein a first end of the first Bowden cable is connected to the backrest upper part and a second end of the first Bowden cable is connected to the locking device such that upon the displacement of the backrest upper part from the non-displaced position to the displaced position, the first end of the first Bowden cable is displaceable, whereby a pulling force or tension is transferable to the locking device and the locking of the rotary adjusting device is releasable.

2. The vehicle seat according to claim 1, wherein the first Bowden cable is a push-pull Bowden cable.

3. The vehicle seat according to claim 1, wherein a return spring is connected to the second end of the first Bowden cable, wherein by means of the return spring upon the displacement of the backrest upper part from the displaced position into the non-displaced position, the locking of the rotary adjusting device can be obtained.

4. The vehicle seat according to claim 1, further comprising:
a second Bowden cable, wherein the second Bowden cable is connected to the rotary adjusting device and to the backrest upper part and adapted to transfer, by rotation of the vehicle seat by means of the rotary adjusting device from a rotated position to a normal position of the vehicle seat, the backrest upper part from the displaced position to the non-displaced position.

5. The vehicle seat according to claim 4, wherein a return spring is connected to the second end of the first Bowden cable, wherein by means of the return spring upon displacement of the backrest upper part from the displaced position into the non-displaced position, the locking of the rotary adjusting device can be obtained.

6. A vehicle seat, comprising:
a backrest comprising a backrest lower part and a backrest upper part that can be displaced relative to the backrest lower part, wherein the vehicle seat is connected to a rotary adjusting device for rotating the vehicle seat and wherein the rotary adjusting device comprises a locking device for locking the rotary adjusting device, wherein the backrest upper part and the locking device are interconnected such that upon a displacement of the backrest upper part relative to the backrest lower part from a non-displaced position into a displaced position, the locking of the rotary adjusting device is releasable; and a first Bowden cable, which is connected to the rotary adjusting device and to the backrest upper part and adapted to transfer, by rotation of the vehicle seat by means of the rotary adjusting device from a rotated position to a normal position of the vehicle seat, the backrest upper part from the displaced position to the non-displaced position.

7. The vehicle seat according to claim 6, wherein a return spring is connected to a second end of the first Bowden cable, wherein by means of the return spring upon displacement of the backrest upper part from the displaced position into the non-displaced position, the locking of the rotary adjusting device can be obtained.

8. A vehicle seat, comprising:
a backrest comprising a backrest lower part and a backrest upper part that can be displaced relative to the backrest lower part, wherein the vehicle seat is connected to a rotary adjusting device for rotating the vehicle seat, and wherein the rotary adjusting device comprises a locking device for locking the rotary adjusting device, wherein the backrest upper part and the locking device are interconnected such that upon a displacement of the backrest upper part relative to the backrest lower part from a non-displaced position into a displaced position, the locking of the rotary adjusting device is releasable;

a first sensor, which is designed and provided to detect the displacement of the backrest upper part relative to the backrest lower part from the non-displaced position into the displaced position, wherein after detection of the displacement of the backrest upper part, the locking of the rotary adjusting device is releasable, and to detect a displacement of the backrest upper part from the displaced position into the non-displaced position, wherein after the displacement, the locking of the rotary adjusting device can be obtained; and an electronic control unit, which is designed and provided to receive and process first signals of the first sensor, wherein starting from the first signals of the first sensor, the electronic control unit transmits a locking device control signal to an actuator unit, wherein the actuator unit is designed to operate the locking device.

\* \* \* \* \*